US009084280B2

(12) United States Patent
Zhang et al.

(10) Patent No.: US 9,084,280 B2
(45) Date of Patent: Jul. 14, 2015

(54) APPARATUS AND METHOD FOR RESOLVING A SERVING GRANT DEADLOCK AT A MOBILE STATION CONFIGURED FOR ENHANCED UPLINK (EUL)

(71) Applicant: QUALCOMM Incorporated, San Diego, CA (US)

(72) Inventors: Yi Zhang, San Diego, CA (US); Sitaramanjaneyulu Kanamarlapudi, San Diego, CA (US); Liangchi Hsu, San Diego, CA (US); Omesh Kumar Handa, Carlsbad, CA (US); Mohamed A. El-saidny, Dubai (AE); Chaitanya B. Shah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 13/747,720

(22) Filed: Jan. 23, 2013

(65) Prior Publication Data

US 2013/0336106 A1    Dec. 19, 2013

Related U.S. Application Data

(60) Provisional application No. 61/659,689, filed on Jun. 14, 2012.

(51) Int. Cl.
*H04W 72/14*  (2009.01)
*H04W 72/12*  (2009.01)

(52) U.S. Cl.
CPC .......... *H04W 72/14* (2013.01); *H04W 72/1289* (2013.01); *H04W 72/1294* (2013.01)

(58) Field of Classification Search
CPC ................. H04W 28/04; H04W 72/04–72/14; H04W 72/1294; H04W 72/1278
USPC .......................................... 370/216, 235, 329
See application file for complete search history.

(56) References Cited

U.S. PATENT DOCUMENTS 8,259,580 B2     9/2012  Marinier et al.
2006/0268938 A1  11/2006  Terry
(Continued)

FOREIGN PATENT DOCUMENTS

SE   WO 2011/162707 A1 * 12/2011 ............ H04W 28/04
WO       2011162707 A1    12/2011

OTHER PUBLICATIONS

"3rd Generation Partnership Project; Technical Specification Group Radio Access Network; Medium Access Control (MAC) protocol specification (Release 8)", 3GPP Standard; 3GPP TS 25.321, 3rd Generation Partnership Project (3GPP), Mobile Competence Centre; 650, Route Des Lucioles ; F-06921 Sophia-Antipolis Cedex; France, No. V8.12.0, Dec. 17, 2010, pp. 1-189, XP050462109, [retrieved on Dec. 17, 2010] Section 11.8.1.4.
(Continued)

*Primary Examiner* — Afsar M Qureshi
(74) *Attorney, Agent, or Firm* — Charles E. Eggers

(57) ABSTRACT

A user equipment (UE) and a method of using the UE are provided for fulfilling a network's intent to increase or decrease the serving grant for the UE in spite of a deadlock condition that may otherwise prevent fulfillment of the network's intent. That is, upon determining the network's intent, the UE may alter its serving grant according the intent by altering the number of packets for transmission in a TTI.

36 Claims, 13 Drawing Sheets

(56) References Cited

U.S. PATENT DOCUMENTS

| | | |
|---|---|---|
| 2007/0177536 A1 | 8/2007 | Brueck et al. |
| 2008/0080381 A1* | 4/2008 | Maheshwari et al. ........ 370/235 |
| 2008/0298317 A1* | 12/2008 | Yang et al. ................... 370/329 |
| 2009/0086709 A1 | 4/2009 | Pani et al. |
| 2010/0202360 A1 | 8/2010 | Terry |
| 2010/0220647 A1* | 9/2010 | Baker et al. .................. 370/328 |
| 2011/0083065 A1* | 4/2011 | Singh et al. .................. 714/807 |
| 2012/0120899 A1* | 5/2012 | Kazmi et al. ................. 370/329 |
| 2012/0213092 A1* | 8/2012 | Sun et al. ...................... 370/248 |
| 2012/0220324 A1 | 8/2012 | Sambhwani et al. |
| 2013/0136070 A1* | 5/2013 | Cheng et al. ................. 370/329 |

OTHER PUBLICATIONS

International Search Report and Written Opinion—PCT/US2013/044907—ISA/EPO—Feb. 5, 2014.

Partial International Search Report—PCT/US2013/044907—ISA/EPO—Nov. 14, 2013.

* cited by examiner

| Frame No. | Serving RGCH | Serving Grant | LUPR | Happy Bit | E-TFCI | TBS |
|---|---|---|---|---|---|---|
| 680 | UP | 30 | 29 | 0 | 108 | 9780 |
| 681 | UP | 30 | 29 | 0 | 108 | 9780 |
| 682 | UP | 30 | 29 | 0 | 108 | 9780 |
| 683 | UP | 30 | 29 | 0 | 108 | 9780 |
| 684 | UP | 30 | 29 | 0 | 108 | 9780 |
| 685 | UP | 30 | 29 | 0 | 108 | 9780 |
| 686 | UP | 30 | 29 | 0 | 108 | 9780 |
| 687 | UP | 30 | 29 | 0 | 108 | 9780 |
| 688 | UP | 30 | 29 | 0 | 108 | 9780 |
| 689 | UP | 30 | 29 | 0 | 108 | 9780 |
| 690 | UP | 30 | 29 | 0 | 108 | 9780 |
| 691 | UP | 30 | 29 | 0 | 108 | 9780 |
| 692 | UP | 30 | 29 | 0 | 108 | 9780 |
| 693 | UP | 30 | 29 | 0 | 108 | 9780 |
| 694 | UP | 30 | 29 | 0 | 108 | 9780 |

*FIG. 7*

| Serving Grant | Selected E-TFCI | LUPR | DOWN Received → New SG |
|---|---|---|---|
| 13 | 3 | 13 | 12 |
| 14 | 3 | 13 | 12 |
| 15 | 3 | 13 | 12 |
| 16 | 8 | 16 | 15 |
| 17 | 8 | 16 | 15 |
| 18 | 8 | 16 | 15 |
| 19 | 13 | 19 | 18 |
| 20 | 20 | 20 | 19 |
| 21 | 25 | 21 | 20 |
| 22 | 33 | 22 | 21 |
| 23 | 42 | 23 | 22 |
| 24 | 54 | 24 | 23 |
| 25 | 60 | 25 | 24 |
| 26 | 72 | 26 | 25 |
| 27 | 84 | 27 | 26 |
| 28 | 100 | 28 | 27 |
| 29 | 112 | 31 | 30 |
| 30 | 112 | 31 | 30 |
| 31 | 114 | 31 | 30 |
| 32 | 124 | 32 | 31 |

| Frame No. | Serving RGCH | Serving Grant | LUPR | Happy Bit | E-TFCI | TBS |
|---|---|---|---|---|---|---|
| 915 | DOWN | 30 | 31 | 0 | 112 | 10116 |
| 916 | DOWN | 30 | 31 | 0 | 112 | 10116 |
| 917 | DOWN | 30 | 31 | 0 | 112 | 10116 |
| 918 | DOWN | 30 | 31 | 0 | 112 | 10116 |
| 919 | DOWN | 30 | 31 | 0 | 112 | 10116 |
| 920 | DOWN | 30 | 31 | 0 | 112 | 10116 |
| 921 | DOWN | 30 | 31 | 0 | 112 | 10116 |
| 922 | DOWN | 30 | 31 | 0 | 112 | 10116 |
| 923 | DOWN | 30 | 31 | 0 | 112 | 10116 |
| 924 | DOWN | 30 | 31 | 0 | 112 | 10116 |
| 925 | DOWN | 30 | 31 | 0 | 112 | 10116 |
| 926 | DOWN | 30 | 31 | 0 | 112 | 10116 |
| 927 | DOWN | 30 | 31 | 0 | 112 | 10116 |
| 928 | DOWN | 30 | 31 | 0 | 112 | 10116 |
| 929 | DOWN | 30 | 31 | 0 | 112 | 10116 |

*FIG. 9*

APPARATUS AND METHOD FOR RESOLVING A SERVING GRANT DEADLOCK AT A MOBILE STATION CONFIGURED FOR ENHANCED UPLINK (EUL)

CROSS-REFERENCE TO RELATED APPLICATIONS

This application claims priority to and the benefit of provisional patent application No. 61/659,689, entitled "APPARATUS AND METHOD FOR RESOLVING A SERVING GRANT DEADLOCK AT A MOBILE STATION CONFIGURED FOR ENHANCED UPLINK (EUL)", and filed in the United States Patent and Trademark Office on Jun. 14, 2012, the entire content of which is incorporated herein by reference.

TECHNICAL FIELD

Aspects of the present disclosure relate generally to wireless communication systems, and more particularly, to serving grants to control uplink data rates in a wireless communication system.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In various aspects of the disclosure, a user equipment (UE) and a method of using the UE are provided for fulfilling a network's intent to increase or decrease the serving grant for the UE in spite of a deadlock condition that may otherwise prevent fulfillment of the network's intent. That is, upon determining the network's intent, the UE may alter its serving grant according the intent by altering the number of packets for transmission in a TTI.

In one aspect, the disclosure provides a method of wireless communication operable at a user equipment (UE), including receiving a first relative grant indicating an intent to alter a serving grant for the UE, determining that a deadlock condition prevents an alteration of the serving grant for the UE according to the intent, and altering the serving grant for the UE according to the intent by altering a number of packets for transmission in a transmission time interval (TTI).

Another aspect of the disclosure provides a method of wireless communication operable at a UE, including receiving a first relative grant indicating an intent to alter an uplink data transmission rate for the UE, determining, in accordance with an E-TFCI selection procedure, a serving grant under-utilization loss corresponding to a truncated portion of a packet corresponding to the first relative grant, storing information corresponding to the serving grant under-utilization loss in a memory as a portion of a sum of cumulative stored serving grant under-utilization losses, determining that the cumulative stored serving grant under-utilization losses total greater than a predetermined threshold, and unilaterally increasing serving grant for the UE to include an additional packet in accordance with the stored information corresponding to the serving grant under-utilization loss.

Another aspect of the disclosure provides a UE operable in a wireless communication network, including means for receiving a first relative grant indicating an intent to alter a serving grant for the UE, means for determining that a deadlock condition prevents an alteration of the serving grant for the UE according to the intent, and means for altering the serving grant for the UE according to the intent by altering a number of packets for transmission in a transmission time interval (TTI).

Another aspect of the disclosure provides a UE operable in a wireless communication network, including means for receiving a first relative grant indicating an intent to alter the UE's uplink data transmission rate, means for determining, in accordance with an E-TFCI selection procedure, a serving grant under-utilization loss corresponding to a truncated portion of a packet corresponding to the first relative grant, means for storing information corresponding to the serving grant under-utilization loss in a memory as a portion of a sum of cumulative stored serving grant under-utilization losses, means for determining that the cumulative stored serving grant under-utilization losses total greater than a predetermined threshold, and means for unilaterally increasing a serving grant for the UE to include an additional packet in accordance with the information corresponding to stored serving grant under-utilization loss.

Another aspect of the disclosure provides a UE operable in a wireless communication network, including at least one processor, a communication interface coupled to the at least one processor, and a memory coupled to the at least one processor. Here, the at least one processor is configured to receive a first relative grant indicating an intent to alter a serving grant for the UE, to determine that a deadlock condition prevents an alteration of the serving grant for the UE according to the intent, and to alter the serving grant for the UE according to the intent by altering a number of packets for transmission in a transmission time interval (TTI).

Another aspect of the disclosure provides a UE operable in a wireless communication network, including at least one processor, a communication interface coupled to the at least one processor, and a memory coupled to the at least one processor. Here, the at least one processor is configured to receive a first relative grant indicating an intent to alter the UE's uplink data transmission rate, to determine, in accordance with an E-TFCI selection procedure, a serving grant under-utilization loss corresponding to a truncated portion of a packet corresponding to the first relative grant, to store information corresponding to the serving grant under-utilization loss in a memory as a portion of a sum of cumulative stored serving grant under-utilization losses, to determine that the cumulative stored serving grant under-utilization losses total greater than a predetermined threshold, and unilaterally to increase a serving grant for the UE to include an additional packet in accordance with the information corresponding to the stored serving grant under-utilization loss.

Another aspect of the disclosure provides a computer program product, including a computer-readable storage medium operable at a UE, the storage medium including instructions for causing a computer to receive a first relative grant indicating an intent to alter a serving grant for the UE, instructions for causing a computer to determine that a deadlock condition prevents an alteration of the serving grant for the UE according to the intent, and instructions for causing a computer to alter the serving grant for the UE according to the intent by altering a number of packets for transmission in a transmission time interval (TTI).

Another aspect of the disclosure provides a computer program product, including a computer-readable storage medium operable at a UE, the storage medium including instructions for causing a computer to receive a first relative grant indicating an intent to alter the UE's uplink data transmission rate, instructions for causing a computer to determine, in accordance with an E-TFCI selection procedure, a serving grant under-utilization loss corresponding to a truncated portion of a packet corresponding to the first relative grant, instructions for causing a computer to store information corresponding to the serving grant under-utilization loss in a memory as a portion of a sum of cumulative stored serving grant under-utilization losses, instructions for causing a computer to determine that the cumulative stored serving grant under-utilization losses total greater than a predetermined threshold, and instructions for causing a computer to unilaterally increase a serving grant for the UE to include an additional packet in accordance with the information corresponding to the stored serving grant under-utilization loss.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 7 is a table showing one possible network configuration that may result in a deadlock condition inhibiting an increase in a serving grant.

FIG. 8 is a table showing one possible network configuration that may result in a deadlock condition inhibiting a decrease in a serving grant.

FIG. 9 is a table showing one possible network configuration that may result in a deadlock condition inhibiting a decrease in a serving grant.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
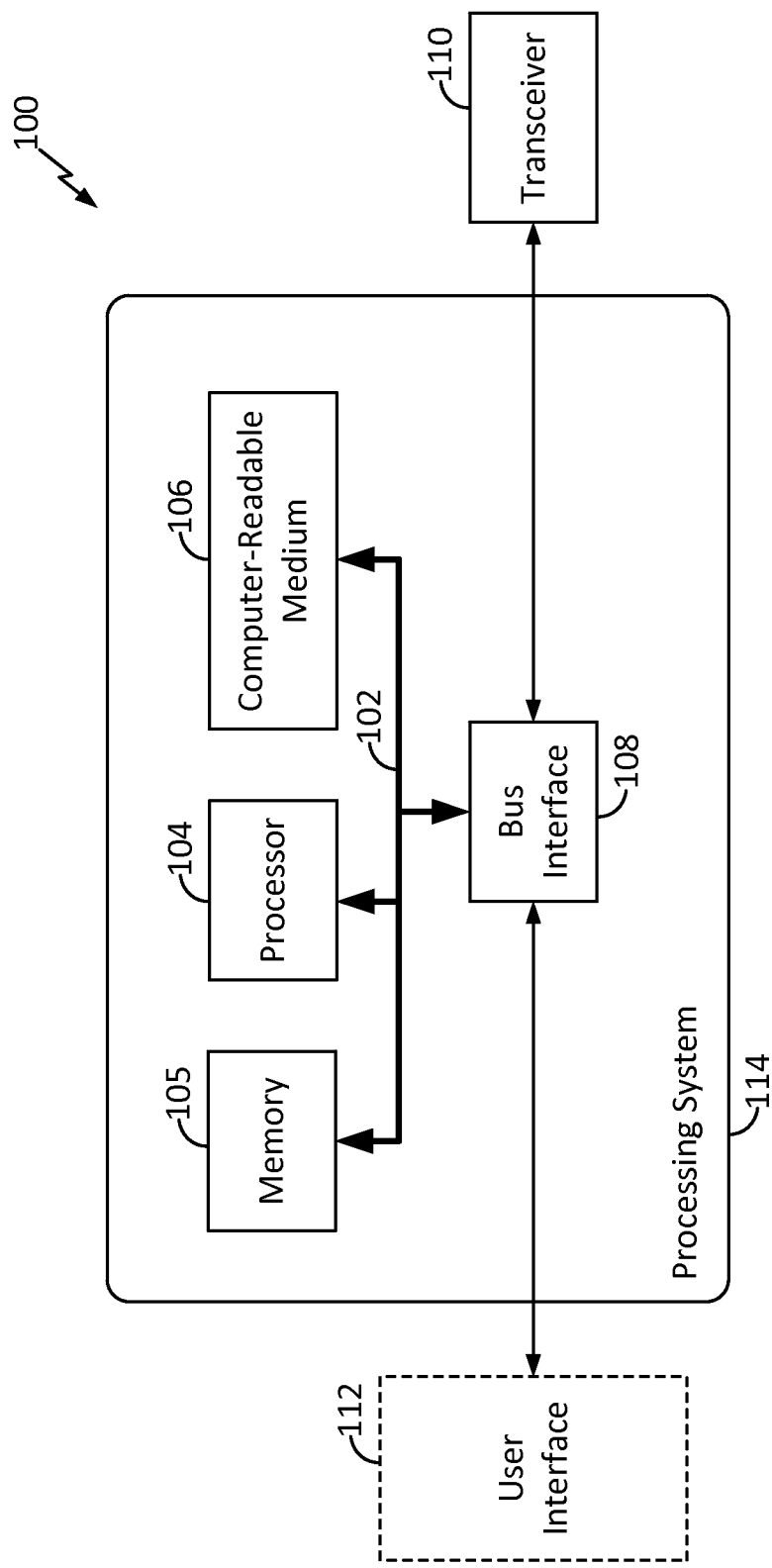
FIG. 1 is a block diagram illustrating an example of a hardware implementation for an apparatus employing a processing system.

FIG. 1 is a conceptual diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
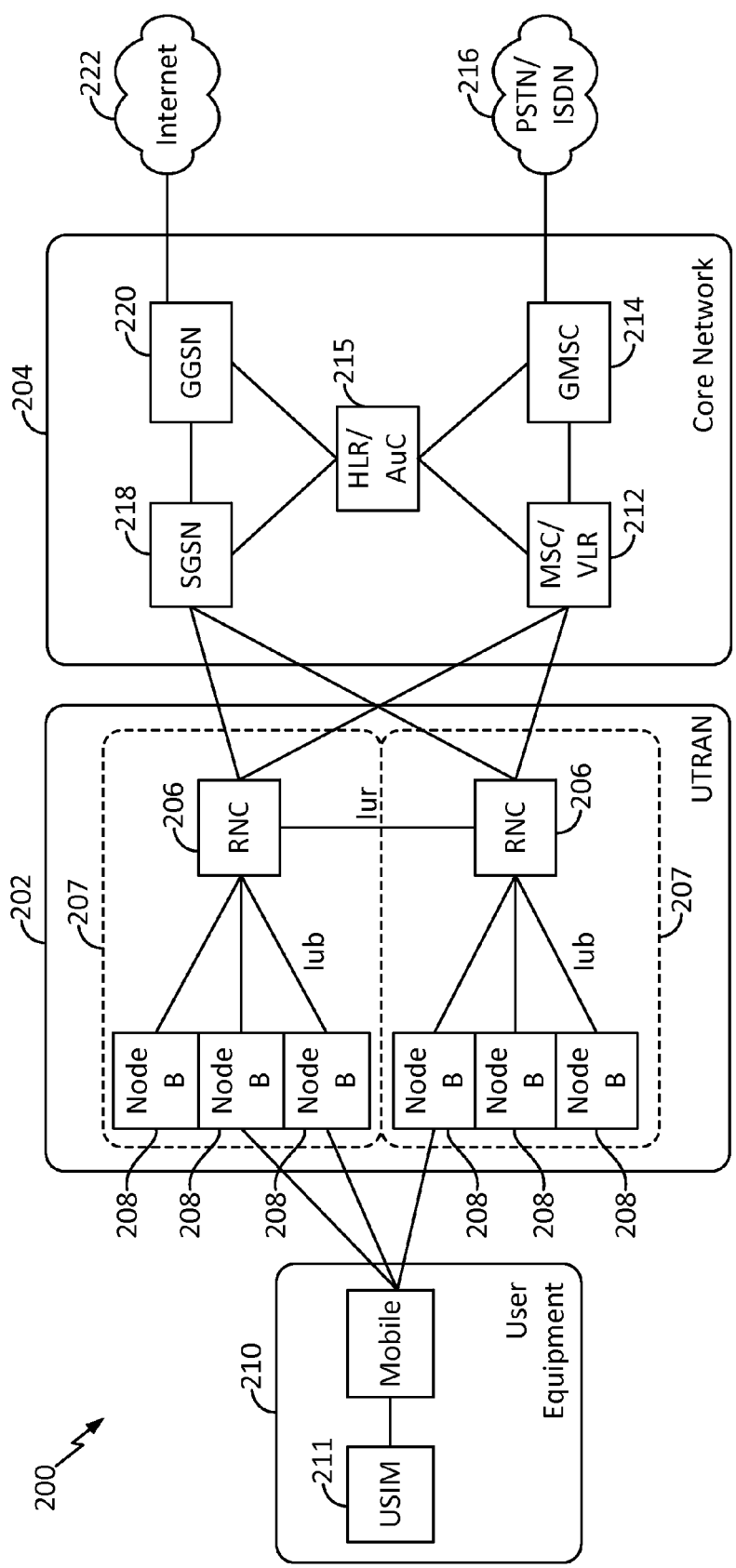
FIG. 2 is a block diagram conceptually illustrating an example of a telecommunications system.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a Universal Mobile Telecommunications System (UMTS) system 200. A UMTS network includes three interacting domains: a core network 204, a radio access network (RAN) (e.g., the UMTS Terrestrial Radio Access Network (UTRAN) 202), and a user equipment (UE) 210. Among several options available for a UTRAN 202, in this example, the illustrated UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208.

The core network 204 can interface with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

Figure 3:
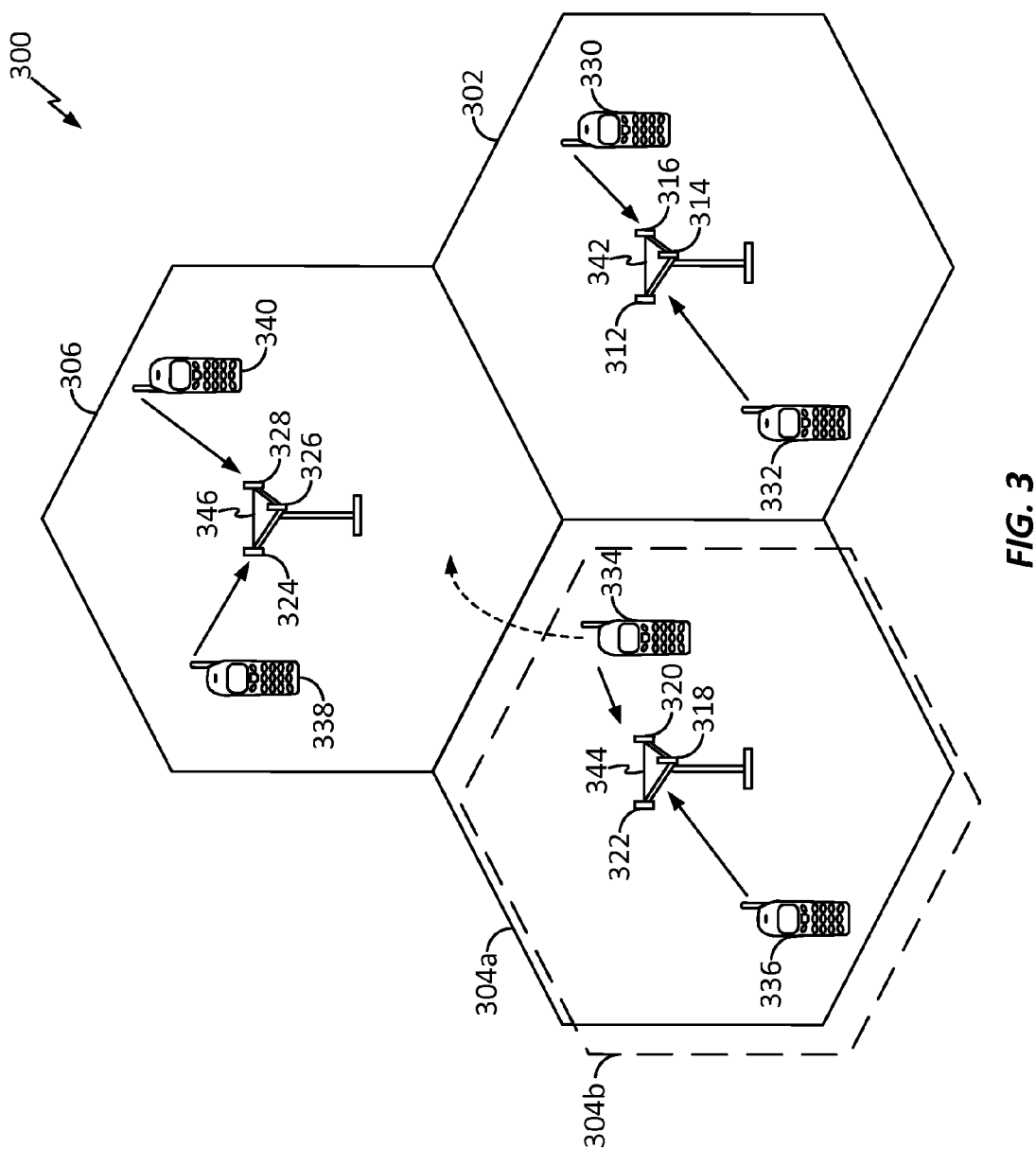
FIG. 3 is a conceptual diagram illustrating an example of an access network.

The UTRAN 202 is one example of a RAN that may be utilized in accordance with the present disclosure. Referring to FIG. 3, by way of example and without limitation, a simplified schematic illustration of a RAN 300 in a UTRAN architecture is illustrated. The system includes multiple cellular regions (cells), including cells 302, 304, and 306, each of which may include one or more sectors. Cells may be defined geographically (e.g., by coverage area) and/or may be defined in accordance with a frequency, scrambling code, etc. That is, the illustrated geographically-defined cells 302, 304, and 306 may each be further divided into a plurality of cells, e.g., by utilizing different scrambling codes. For example, cell 304a may utilize a first scrambling code, and cell 304b, while in the same geographic region and served by the same Node B 344, may be distinguished by utilizing a second scrambling code.

In a cell that is divided into sectors, the multiple sectors within a cell can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 may each correspond to a different sector. In cell 306, antenna groups 324, 326, and 328 may each correspond to a different sector.

The cells 302, 304, and 306 may include several UEs that may be in communication with one or more sectors of each cell 302, 304, or 306. For example, UEs 330 and 332 may be in communication with Node B 342, UEs 334 and 336 may be in communication with Node B 344, and UEs 338 and 340 may be in communication with Node B 346. Here, each Node B 342, 344, and 346 may be configured to provide an access point to a core network 204 (see FIG. 2) for all the UEs 330, 332, 334, 336, 338, and 340 in the respective cells 302, 304, and 306.

During a call with a source cell, or at any other time, the UE 336 may monitor various parameters of the source cell as well as various parameters of neighboring cells. Further, depending on the quality of these parameters, the UE 336 may maintain communication with one or more of the neighboring cells. During this time, the UE 336 may maintain an Active Set, that is, a list of cells to which the UE 336 is simultaneously connected (i.e., the UTRAN cells that are currently assigning a downlink dedicated physical channel DPCH or fractional downlink dedicated physical channel F-DPCH to the UE 336 may constitute the Active Set).

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for a frequency division duplexing (FDD). FDD uses a different carrier frequency for the uplink (UL) and downlink (DL) between a Node B 408 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

A high speed packet access (HSPA) air interface includes a series of enhancements to the W-CDMA air interface between the UE 210 and the UTRAN 202, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

In a wireless telecommunication system, the communication protocol architecture may take on various forms depending on the particular application. For example, in an HSPA system, the signaling protocol stack is divided into a Non-Access Stratum (NAS) and an Access Stratum (AS). The NAS provides the upper layers, for signaling between the UE 210 and the core network 204 (referring to FIG. 2), and may include circuit switched and packet switched protocols. The AS provides the lower layers, for signaling between the UTRAN 202 and the UE 210, and may include a user plane and a control plane. Here, the user plane or data plane carries user traffic, while the control plane carries control information (i.e., signaling).

Figure 4:
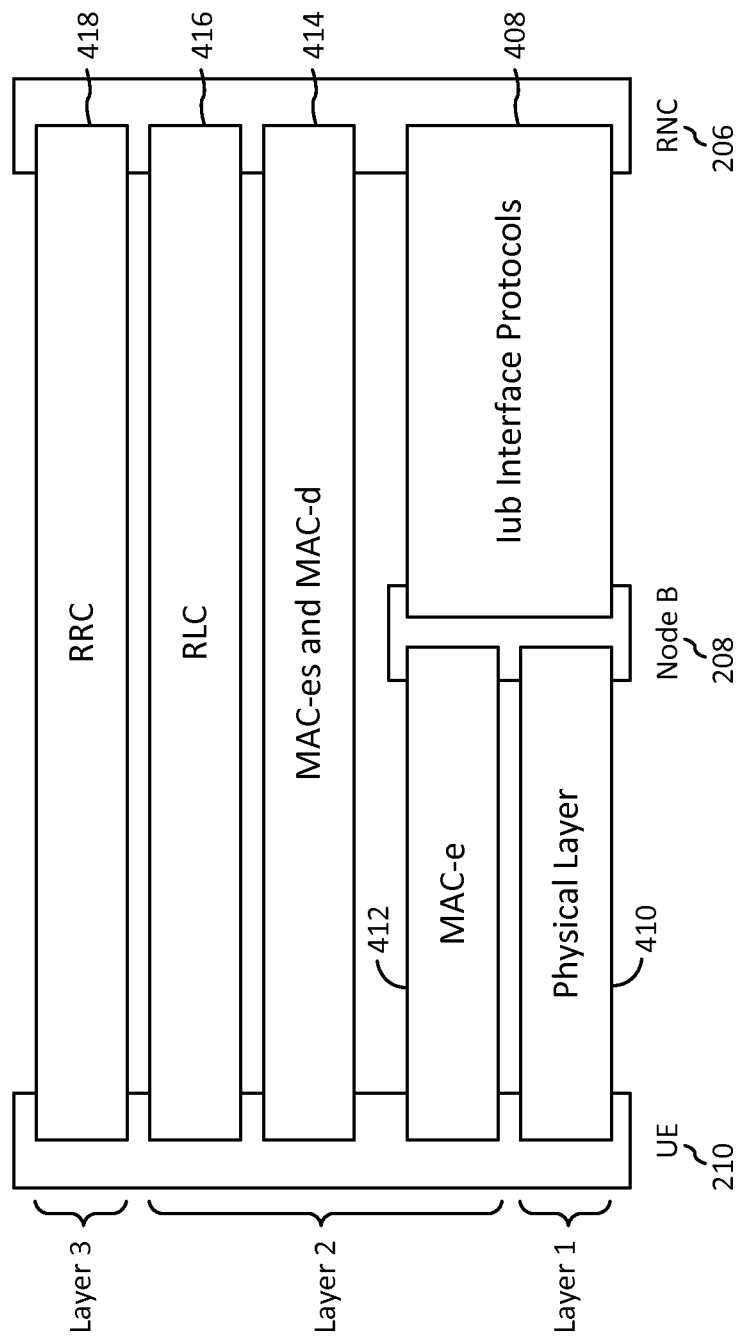
FIG. 4 is a conceptual diagram illustrating an example of access stratum protocol layers for use in HSUPA according to one example.

Turning to FIG. 4, the AS protocol layers as they may be utilized for HSUPA are shown with three layers: Layer 1, Layer 2, and Layer 3. Layer 1 is the lowest layer and implements various physical layer signal processing functions. Layer 1 will be referred to herein as the physical layer 410. The data link layer, called Layer 2, is above the physical layer 410, and include the MAC layer, which itself includes a MAC-e entity 412 between the UE 210 and the Node B 208 and a MAC-es and MAC-d entity 414 between the UE 210 and the RNC 206, and an RLC layer 416 also between the UE 210 and the RNC 206.

At Layer 3, an RRC layer 418 handles the control plane signaling between the UE 210 and the Node B 208. RRC layer 418 includes a number of functional entities for routing higher layer messages, handling broadcasting and paging functions, establishing and configuring radio bearers, etc.

Although not shown, the UE may have several upper layers above the RRC layer 418, including a network layer (e.g., IP layer) that is terminated at a PDN gateway on the network side and an application layer that is terminated at the other end of the connection (e.g., far end UE, server, etc.).

In the illustration, Layer 2 is split into sublayers. The RLC sublayer 416 generally provides segmentation and reassembly of upper layer data packets and reordering of data packets to compensate for out-of-order reception due to a hybrid automatic repeat request (HARQ) at the MAC layers. Here, the size of the RLC protocol data units (PDUs) may vary, and generally is set according to the smallest possible bit rate for the service utilizing the RLC entity 416.

The MAC sublayers 412, 414 provide multiplexing between logical and transport channels. To implement MAC protocols and procedures for HSUPA, the 3GPP Release 6 specifications define certain sub-layers of the MAC for the uplink called MAC-e/es. These sub-layers operate at the Node B 208 (MAC-e), at the RNC 206 (MAC-es), and the UE 210 (both the MAC-e and the MAC-es). The location of the MAC-e 412 in the Node B 208 enables fast retransmissions at the physical layer 410. The location of the MAC-es 414 in the RNC 206 is responsible for reordering of the data packets, since for HSUPA, a UE 402 may be in soft handover with multiple Node Bs 208.

In some examples, a MAC-i (or MAC-is) may optionally be utilized to replace the MAC-e/es, providing additional functionality such as flexible PDU sizes and segmentation/reassembly.

Information is passed from the MAC layers 412, 414 to the physical layer 410 in the form of transport channels. That is, transport channel frames are constructed by the MAC sub-layer 412, 414 in the UE 210 and sent over the air interface to each Node B 208 with which the UE 210 is in soft handover.

Data generated at higher layers, all the way down to the MAC layers 412, 414, are carried over the air through transport channels. The RNC 206 may receive identical transport channel frames from each Node B 208 over the Iub interfaces 408, and perform re-ordering.

Figure 5:
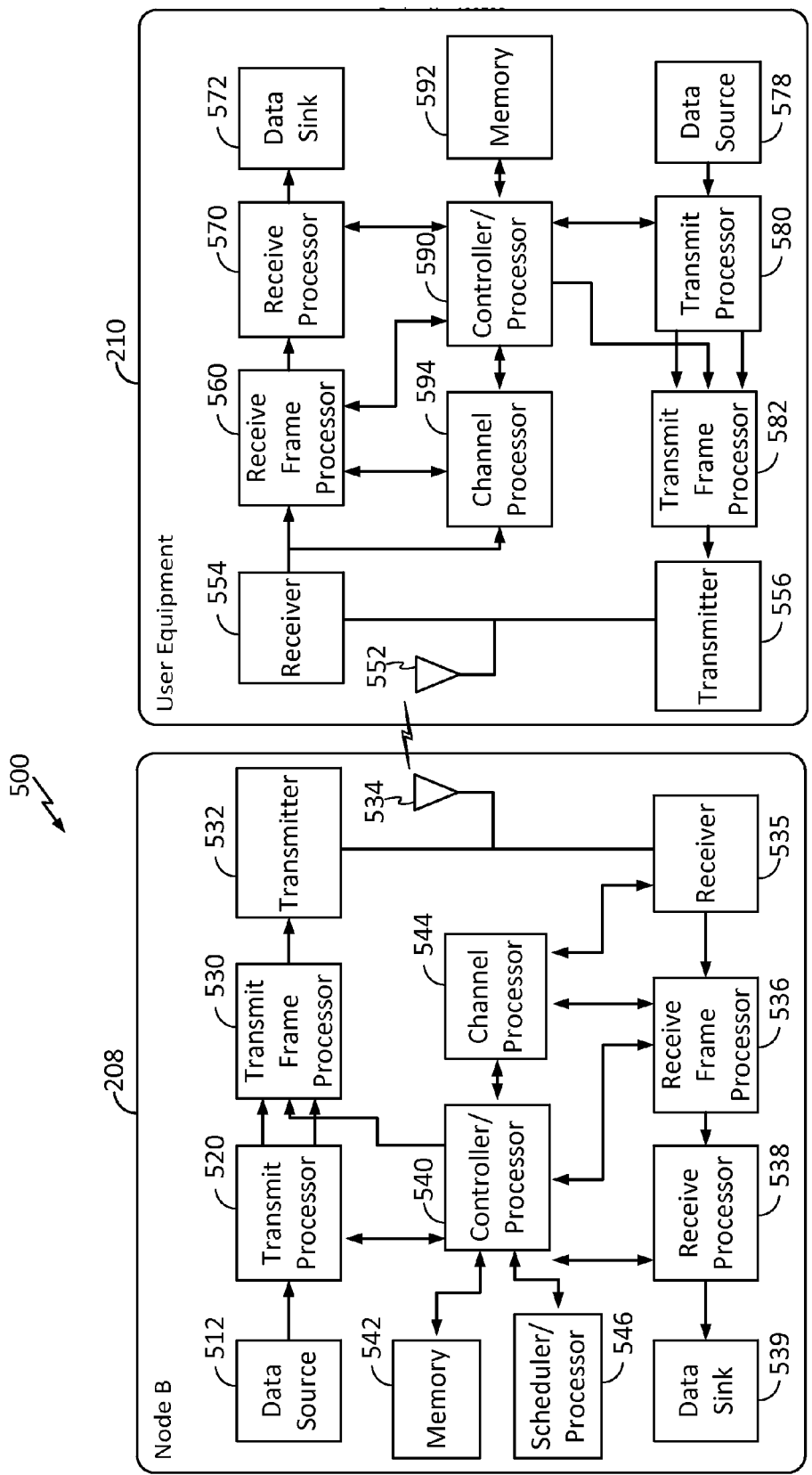
FIG. 5 is a block diagram conceptually illustrating an example of a Node B in communication with a UE in a telecommunications system.

Referring now to FIG. 5, a block diagram is provided showing an exemplary Node B 208 in communication with an exemplary UE 210, where the Node B 208 may be the Node B 208 in FIGS. 2 and 4, and the UE 210 may be the UE 210 in FIGS. 2 and 4. In the downlink communication, a transmit processor 520 at the Node B 208 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 210 or from feedback from the UE 210. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 210, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 208. More specifically, the receive processor 570 descrambles and despreads the symbols, and then determines the most likely signal constellation points transmitted by the Node B 208 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 210 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 210 and various user interfaces (e.g., keyboard). Similar to the functionality described in connection with the downlink transmission by the Node B 208, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 208 or from feedback contained in the midamble transmitted by the Node B 208, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 208 in a manner similar to that described in connection with the receiver function at the UE 210. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 210. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 208 and the UE 210, respectively. For example, the controller/processors 540 and 590 may provide various functions including timing, peripheral interfaces, voltage regulation, power management, and other control functions. The computer readable media of memories 542 and 592 may store data and software for the Node B 208 and the UE 210, respectively. A scheduler/processor 546 at the Node B 208 may be used to allocate resources to the UEs and schedule downlink and/or uplink transmissions for the UEs.

3GPP Release 5 specifications introduced downlink enhancements referred to as HSDPA. HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries HARQ ACK/NACK signaling on the uplink to indicate whether a corresponding packet transmission was decoded successfully. That is, with respect to the downlink, the UE 210 provides feedback to the Node B 208 over the HS-DPCCH to indicate whether it correctly decoded a packet on the downlink.

HS-DPCCH further includes feedback signaling from the UE 210 to assist the Node B 208 in taking the right decision in terms of modulation and coding scheme and precoding weight selection, this feedback signaling including information such as a channel quality indicator (CQI) and precoding control information (PCI).

3GPP Release 6 specifications introduced uplink enhancements referred to as Enhanced Uplink (EUL) or High Speed Uplink Packet Access (HSUPA). HSUPA utilizes as its transport channel the EUL Dedicated Channel (E-DCH). The E-DCH is transmitted in the uplink together with the Release 99 DCH. The control portion of the DCH, that is, the DPCCH, carries pilot bits and downlink power control commands on uplink transmissions.

The E-DCH is implemented by physical channels including the E-DCH Dedicated Physical Data Channel (E-DPDCH) and the E-DCH Dedicated Physical Control Channel (E-DPCCH). In addition, HSUPA relies on additional physical channels including the E-DCH HARQ Indicator Channel (E-HICH), the E-DCH Absolute Grant Channel (E-AGCH), and the E-DCH Relative Grant Channel (E-RGCH).

In HSUPA, the E-DCH relative grant channel (E-RGCH) and the E-DCH absolute grant channel (E-AGCH) carry the Node B scheduling control information to control the uplink transmission rate.

Specifically, the E-AGCH provides absolute grants for UEs in the cell. That is, the E-AGCH is a shared channel broadcasted to all UEs in the cell, providing information to set a desired serving grant at a particular UE in the cell as well as an identifier for the selected UE. While this absolute grant does provide a high level of control and flexibility, its use is expensive in terms of available radio resources on the downlink. That is, absolute grants are sent utilizing convolutional coding, and are accompanied utilizing a UE-specific 16-bit CRC for identifying the selected UE.

The E-RGCH functions to increase and decrease the EUL uplink transmission rate by carrying "UP," "DOWN," or "HOLD" commands. In effect, the relative grants provided on the E-RGCH enable control of the gain factors utilized at the UE 210, where the gain factors thereby map to a particular data rate allowed for the UE 210. A non-serving E-RGCH (i.e., an E-RGCH transmitted from a non-serving cell) is generally limited to being used to control an overload condition, e.g., by sending a rate DOWN (or HOLD) command.

Further, for HSUPA, an E-DCH transport format combination indicator (E-TFCI) is carried on the E-DPCCH, and utilized to indicate the E-DCH transport block size. The E-DPCCH further includes a power offset for setting the power of the EUL uplink channel relative to the power of the DPCCH.

As described above, in a UE 210 configured for HSUPA/EUL, the serving E-RGCH "UP" command may be transmitted by the network to increase the serving grant for the UE 210 by one step, so the UE 210 can increase its EUL data rate. However, an issue that may arise in such a system is that the power corresponding to one step or increment of serving grant increase may not be large enough to accommodate one more RLC PDU for scheduled data on the EUL.

Figure 6:
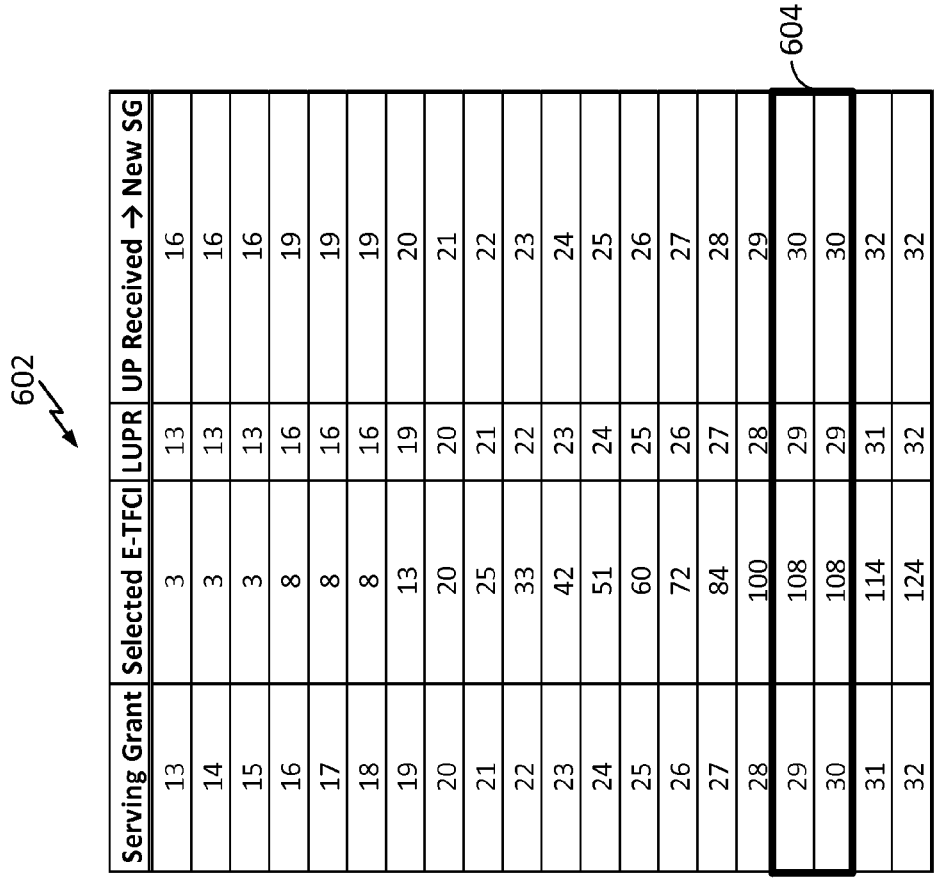
FIG. 6 is a table showing one possible network configuration that may result in a deadlock condition inhibiting an increase in a serving grant.

For example, referring now to FIG. 6 (which illustrates one illustrative but nonlimiting example of the issue), a table 602 is provided, with each row showing the resulting serving grant when an UP command is received at a UE on the E-RGCH. That is, the left-most column of the table, titled "serving grant," illustrates a set of serving grant indices that the UE 210 may follow to control the EUL data rate for scheduled data. Corresponding to each serving grant, in the second column is illustrated the corresponding E-TFCI that the UE 210 may use to transmit the EUL scheduled data. According to the serving grant and the E-TFCI, the UE 210 may determine the number of bits to send for the scheduled data to be carried on the EUL.

The third column shows the last used power ratio (LUPR). Within the E-TFCI, there may be four types of data: the scheduled data, non-scheduled data, scheduling information, and padding. The LUPR is only concerned with the scheduled data.

As illustrated in the right-most column, when the UE 210 receives an E-RGCH "UP" command, the serving grant index increases to the illustrated serving grant index in accordance with the LUPR. Here, the serving grant index is mapped to a number of bits for the payload of the scheduled data portion for that E-TFCI. The mapping is accomplished in accordance with a certain equation defined within 3GPP TS 25.321, section 11.8.1.4. Here, according to the serving grant index, the number of bits is quantized, i.e., divided into an integer number of scheduled data portions of the RLC PDU. However, in this calculation, in some circumstances the calculated number of bits for an incremental increase in serving grant index may not be large enough to increase the integer number of scheduled data portions of the RLC PDU. Thus, when the difference is small enough, the same value of E-TFCI may result after the UP command.

As one example, shown in the illustration at box 604, for the serving grant index 29 and 30, it can be seen that both serving grant indices map to the same E-TFCI of 108. This mapping is accomplished according to a certain network configuration, described above. With this configuration, if a UE 210 currently has a serving grant of 29, and that UE 210 receives an UP command on the serving E-RGCH, the serving grant index is incremented to index 30. However, the increase is not large enough to include one more PDU.

Because the increase in the serving grant index is insufficient for the scheduled data portion to increment to the next number of PDUs, and the same number of PDUs is used, the LUPR does not change. Thus, the next time an UP command is received on the E-RGCH, it becomes a deadlock.

In this case, the UE 210 truncates down to the same current number of RLC PDUs used prior to the requested increase, and the LUPR remains unchanged. Thus, the network's intention to increase the data rate of scheduled data at the UE EUL is not achieved. Even if the network were to continuously transmit UP commands on the serving E-RGCH in this situation, the serving grant would never exceed the value of 30. Thus, a deadlock situation may occur in current 3GPP specifications. This phenomenon is quite common in field or lab test logs.

Various aspects of the disclosure provide apparatus and methods enabling a resolution of this deadlock issue, for example, by unilaterally altering the serving grant to include a changed number of packets for the EUL in accordance with the intention of the network. In some examples, this alteration of the serving grant may occur at the moment that an E-RGCH UP or DOWN command is received but the serving grant does not change; in other examples, this alteration of the serving grant may occur after these failed relative grant commands accumulate to a threshold amount of truncated data.

That is, the truncated portion, described above, corresponds to a serving grant under-utilization loss (SGUUL). In an aspect of the present disclosure, the SGUUL may be stored in the memory 592 at the UE 210, and over time, as such SGUUL continues to occur, a cumulative SGUUL may be calculated. Furthermore, if the calculated cumulative SGUUL reaches a particular value, e.g., greater than a suitable threshold value, the UE 210 may be configured to unilaterally increase its serving grant, without explicit instruction for such increase being received from the network. The utilization of the SGUUL is provided in additional detail below in relation to FIG. 12.

Referring now to FIG. 7, an illustration is provided further to show this problem case. The table illustrated here shows a series of frames, identified by their frame numbers at the left-most column, wherein during each frame, as indicated in the second column, an UP command is received on the serving E-RGCH. In the illustration, beginning with the first frame 680, the serving grant index, shown in the third column, has a value of 30, and based on the E-TFCI selection parameters configured by the network, the LUPR reported with this serving grant index, illustrated in the fourth column, has a value of 29.

That is, when the UE 210 receives the E-RGCH UP command, based on the LUPR, even though the network intends to increase the serving grant to the UE 210, the new serving grant index is always (New Serving Grant)=(LUPR+1)=29+1=30, resulting in a deadlock.

A similar deadlock may occur when the network sends a DOWN command on the serving E-RGCH or on a non-serving E-RGCH, with the intention to reduce the serving grant for the UE 210 for scheduled data on the EUL. FIGS. 8-9 are tables similar to those of FIGS. 6-7, illustrating the deadlock condition inhibiting a decrease in the serving grant.

For example, as illustrated at FIG. 8, with one exemplary configuration, a table 802 is provided, with the same columns as those described above with respect to FIG. 6; however, here, a different network configuration is contemplated, and here, the serving E-RGCH (or a non-serving E-RGCH) DOWN command is received instead of the UP command described above. Here, when the UE 210 utilizes serving grant index 30, this serving grant maps to a certain number of bits of scheduled data. This number of bits may be quantized into a certain number of packets (e.g., RLC PDUs), which may lead to a certain LUPR (as illustrated, LUPR 31) in accordance with the network configuration. Here, as illustrated in the right-most column, when the UE 210 receives a relative grant including a serving grant DOWN command, the serving grant index is reduced in accordance with the LUPR. This reduced serving grant index maps to a new number of bits of scheduled data, wherein the reduced number of bits should generally be smaller than the prior number of bits. However, even with the reduced number of bits, quantization of this reduced number of bits may fit into the same number of packets as prior to the DOWN command. Thus, the LUPR may remain at the same value (i.e., 31 in the illustrated example). Thus, the bottleneck condition exists and the reduction in the serving grant index does not change the scheduled data rate.

This deadlock preventing a decrease in the serving grant can be even more detrimental to a network than the deadlock preventing the UP command, described above. That is, when a non-serving cell wishes to reduce the thermal noise and/or to increase the system capacity it may transmit the DOWN command on the non-serving E-RGCH. However, with this deadlock, the failure to reduce the serving grant for a problematic UE can impact multiple cells.

Referring now to FIG. 9, an illustration is provided further to show this problem case. The table illustrated here shows a series of frames, identified by their frame numbers at the left-most column, wherein during each frame, as indicated in the second column, a DOWN command is received on the serving E-RGCH. (The same or similar issue may occur when a DOWN command is received on a non-serving E-RGCH.) In the illustration, beginning with the first frame 915, the serving grant index, shown in the third column, has a value of 30, and based on the E-TFCI selection parameters configured by the network, the LUPR reported with this serving grant index, illustrated in the fourth column, has a value of 31.

That is, when the UE 210 receives the E-RGCH DOWN command, based on the LUPR, even though the network intends to decrease the serving grant to the UE 210, the new serving grant index is always (New Serving Grant)=(LUPR−1)=31−1=30, resulting in a deadlock.

These examples described above in FIGS. 6-9 correspond to particular examples of a network configuration; however, such a deadlock can occur in other network configurations as well. The probability of occurrence of this deadlock depends upon how the network configures reference E-TFCIs and their power offsets. In different configurations, the one step of serving grant increment (according to the UP command) could be a 1-index, 2-index, or 3-index step. The fundamental reason is the fixed uplink PDU size in Release 6 and Release 7 EUL, so a 1-step change of the serving grant index may not be sufficient to alter the number of uplink RLC PDUs for scheduled data on the EUL. This happens when the gap of required power to alter the number of uplink RLC PDUs for scheduled data is larger than the gap of power for corresponding serving grant steps, as described above.

For conventional UEs compliant with 3GPP Release 6 or Release 7, there is no solution to this deadlock. However, for Release 8 UEs supporting MAC-i, when configured with a flexible PDU size, it may be possible to avoid this issue. However, not all Release 8 UEs support MAC-i; and furthermore, even if a UE is capable of utilizing the MAC-i it is not certain that the network would configure that UE to utilize the MAC-i. Thus, even these UEs may face this deadlock.

Moreover, even when a UE is configured with MAC-i, as in Release 8, this deadlock may nevertheless occur if the minimum UL RLC PDU size is large relative to steps in the serving grant. That is, it is possible to adjust the network's configuration of reference E-TFCIs and their power offsets, especially if the network configures non-scheduled data on the EUL. However, that will adversely affect the network's optimal receiver performance, which is sensitive to the UE's TX power vs. E-TFCI curve, and is not good for network capacity. The UE serving grant is only concerned with the scheduled data portion of an E-TFCI, while the network's configuration of reference E-TFCIs and power offsets relates to the total E-DPDCH power for the E-TFCI, which can also include non-scheduled data, scheduling information, and padding. Even further, a non-zero HARQ power offset and the utilization of compressed mode will increase the power gap between E-TFCIs, and will make it more difficult for the network to avoid this issue via configuration adjustment of reference E-TFCIs and power offsets.

It is also possible for a conventional network to send a command on the EUL absolute grant channel (E-AGCH) to the UE 210 so that the UE 210 will have the properly altered serving grant. However, as described above, the E-AGCH is a signaling channel that is expensive in terms of downlink resources. Furthermore, some networks are designed to limit the E-AGCH to a certain value, and then to use the serving E-RGCH to control the serving grant for the UE 210. Thus, the utilization of the E-AGCH alone to address the deadlock issue is not an effective solution.

The same fundamental reason of fixed EUL RLC PDU size can lead to the serving grant not being fully utilized in E-TFCI selection, and there may be some truncation of bits left in the serving grant and not reflected in the LUPR. For example, when the power corresponding to 1 step down of the serving grant is not larger than the truncation bits, the UE LUPR and the effective serving grant will remain the same, and therefore, the network's intention to reduce the EUL scheduled data rate will fail.

Thus, in accordance with various aspects of the present disclosure, a UE 210 may deviate from current 3GPP standards such that the network's intent can be achieved and the deadlock issue described above can accordingly be reduced or avoided.

That is, in one example, when the UE 210 detects a clear network intention to increase the serving grant for the UE 210 (e.g., by receiving greater than a threshold number of "UP" commands over a certain period of time), but the serving grant for the UE is not able to increase due, e.g., to RLC PDU size quantization, and if the serving grant for the UE is not otherwise forbidden to increase (e.g., due to a DOWN command received on a non-serving E-RGCH, or due to an absolute grant received on the E-AGCH), then the UE 210 may increase its serving grant to include one or more smallest scheduled data PDUs to achieve the network's intention to effectively increase the serving grant for the UE 210.

Figure 10:
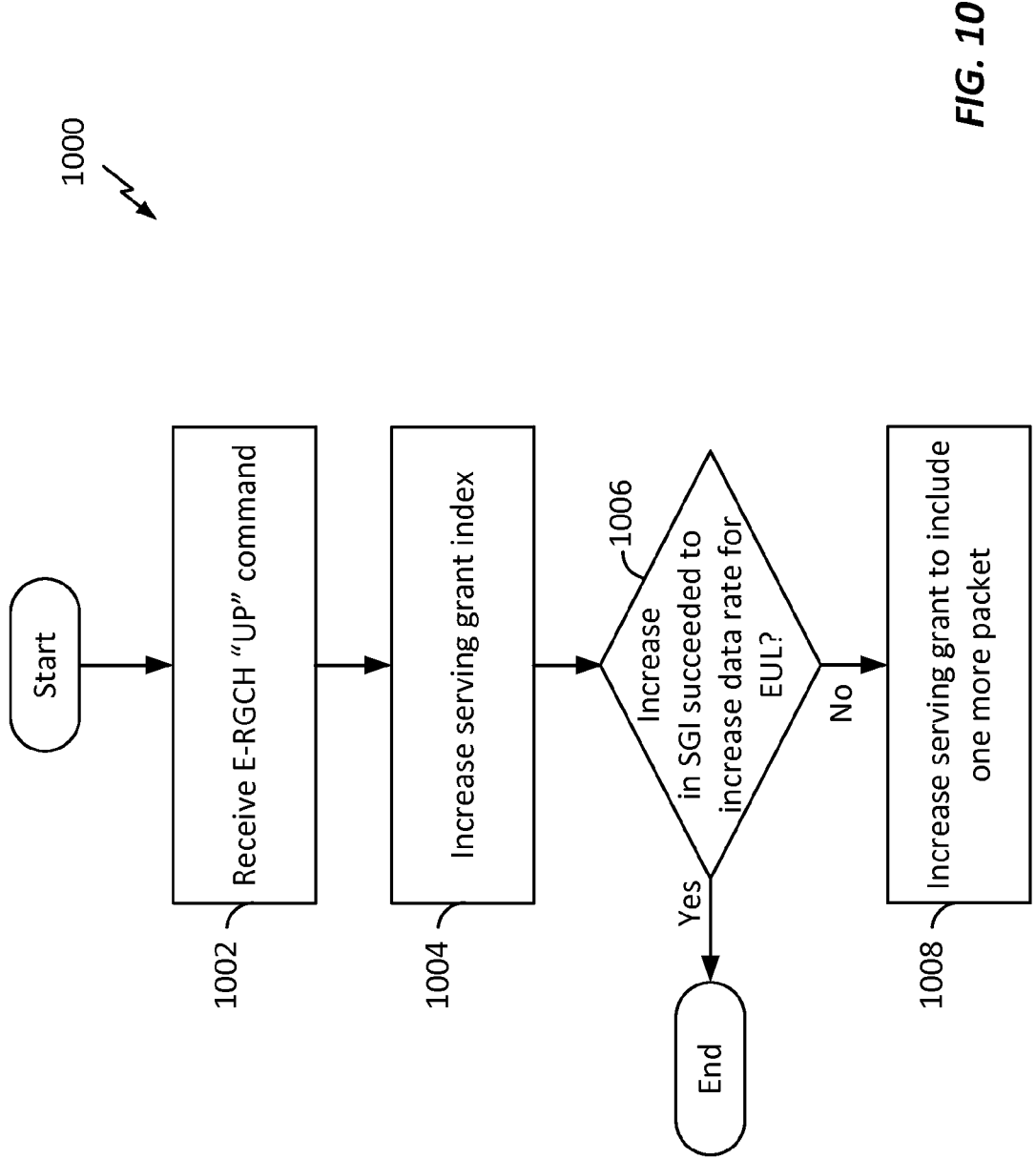
FIG. 10 is a flow chart illustrating a process of increasing a serving grant to fulfill a network intent in accordance with one example.

FIG. 10 is a flow chart illustrating an exemplary process 1000 for increasing a serving grant to fulfill the network intent in spite of the existence of a deadlock condition. In some examples, the process 1000 may be implemented by the UE 210. In some examples, the process 1000 may be implemented by one or more processors such as those described in relation to the processing system 114 illustrated in FIG. 1. In some examples, the process 1000 may be implemented by any suitable means for implementing the described functions.

At step 1002, the UE 210 may receive a relative grant on the E-RGCH including what the UE 210 detects to be an "UP" command. In this example, when the UE 210 detects the UP command on the E-RGCH, assuming that the reception of the command is not the result of a data error, it may be clear that the network's intention is to increase the serving grant for the UE 210 so that the UE 210 may transmit the EUL at a higher data rate. Of course, in another example, the reception of a single E-RGCH "UP" command might not trigger the procedure described below, and the clear network intention to increase the serving grant for the UE 210 may be based on the reception of greater than a threshold number of UP commands.

At step 1004, the UE 210 may increase its serving grant index in accordance with the determined intent of the network. At step 1006, as described above, in certain circumstances according to a particular configuration of the network and/or the UE 210, the UE 210 may determine whether the increase in the serving grant index succeeded to increase the serving grant, e.g., by increasing the data rate for EUL at the UE 210. If successful, the process may end, as the deadlock condition does not exist. On the other hand, the deadlock condition may occur, and the increase in the serving grant index may fail to increase the serving grant. That is, according to an aspect of the present disclosure, a 1-step increment (or any other increment as configured by the network) of the serving grant index from the LUPR (LUPR+1) may be insufficient to add one more RLC PDU into the MAC-e transmission. In this case, at step 1008, then the UE 210 may increase the serving grant, e.g., by the smallest value capable of adding one more RLC PDU of the smallest size in the EUL scheduled data into the transmission. This way, the UE 210 is enabled to comply with the network's intention, and may begin transmitting the EUL at a higher data rate for scheduled data, without the higher cost of utilizing the E-AGCH or a network configuration adjustment.

In a further aspect of the disclosure, when the UE 210 detects a clear network intention to decrease the serving grant for the UE 210 (e.g., by receiving greater than a threshold number of "DOWN" commands over a certain period of time), but the serving grant for the UE 210 is not able to decrease due, e.g., to RLC PDU size quantization, and if the serving grant for the UE 210 is not otherwise forbidden to decrease (e.g., due to an absolute grant received on the E-AGCH), then the UE 210 may decrease its serving grant to include one or more less smallest scheduled data PDUs to achieve the network's intention to effectively decrease the serving grant for the UE 210.

Figure 11:
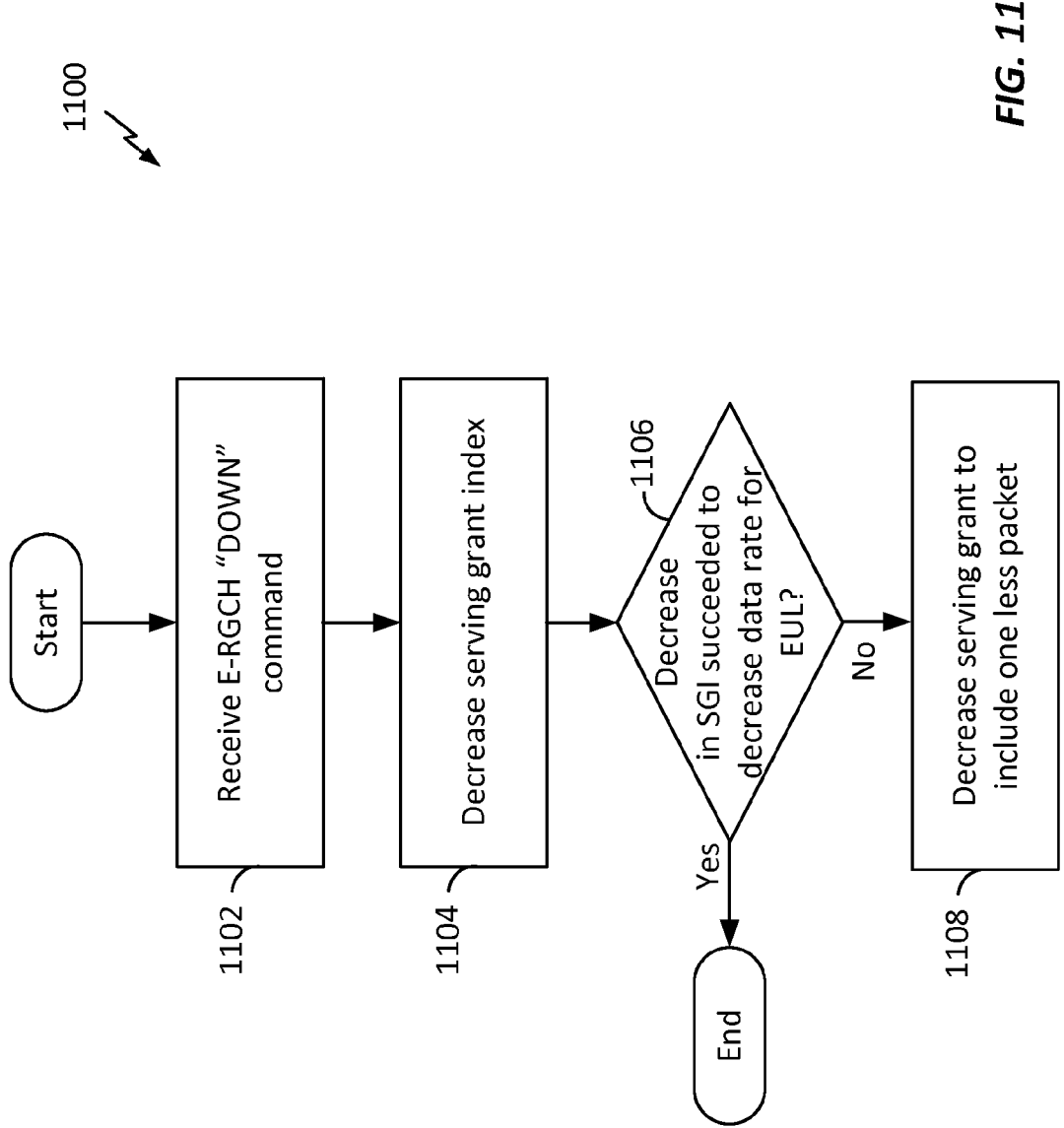
FIG. 11 is a flow chart illustrating a process of decreasing a serving grant to fulfill a network intent in accordance with one example.

FIG. 11 is a flow chart illustrating an exemplary process 1100 for decreasing a serving grant to fulfill the network intent in spite of the existence of a deadlock condition. In some examples, the process 1100 may be implemented by the UE 210. In some examples, the process 1100 may be implemented by one or more processors such as described in relation to the processing system 114 illustrated in FIG. 1. In some examples, the process 1100 may be implemented by any suitable means for implementing the described functions.

At step 1102, the UE 210 may receive a relative grant on an E-RGCH (e.g., the serving E-RGCH or a non-serving E-RGCH) including what the UE 210 detects to be a "DOWN" command. In this example, when the UE 210 detects the DOWN command on the E-RGCH, assuming that the reception of the command is not the result of a data error, it may be clear that the network's intention is to decrease the serving grant for the UE so that the UE 210 may transmit the EUL at a lower data rate. Of course, in another example, the reception of a single E-RGCH "DOWN" command might not trigger the procedure described below, and the clear network intention to decrease the serving grant for the UE 210 may be based on the reception of greater than a threshold number of DOWN commands.

At step 1104, the UE 210 may decrease its serving grant in accordance with the determined intent of the network. At step 1106, as described above, in certain circumstances according to a particular configuration of the network and/or the UE 210, the UE 210 may determine whether the decrease in the serving grant index succeeded to decrease the serving grant, e.g., by decreasing the data rate for EUL at the UE 210. If successful, the process may end, as the deadlock condition does not exist. On the other hand, the deadlock condition may occur, and the decrease in the serving grant index may fail to decrease the serving grant. That is, according to an aspect of the present disclosure, a 1-step decrement (or any other decrement as configured by the network) of the serving grant index from the LUPR (LUPR−1) may be insufficient to subtract one RLC PDU from the MAC-e transmission. In this case, at step 1108, the UE 210 may decrease the serving grant, e.g., by the smallest value capable of subtracting one or more RLC PDUs of the smallest size in the EUL scheduled data from the transmission. This way, the UE 210 is enabled to comply with the network's intention, and may begin transmitting the EUL at a lower data rate for scheduled data, without the higher cost of utilizing the E-AGCH or a network configuration adjustment.

In a further aspect of the disclosure, certain filtering may be utilized in the determination of the network intent according to received relative grants. That is, because the E-RGCH is a signature channel, the probability of a false detection of an UP command is relatively high. Thus, a further aspect of the present disclosure may utilize a suitable filter to reduce or minimize the probability that the increase in the serving grant may occur inadvertently. For example, some implementations may utilize a threshold, such that the above-described increase in the serving grant may occur only after the threshold number of UP commands on the serving E-RGCH are received. Here, the threshold may be a suitable number of consecutive serving E-RGCH UP commands (e.g., five consecutive UP commands). In another example, the threshold may be a number of net UP serving E-RGCH commands detected within a suitable time window (e.g., net five (not necessarily consecutive) UP commands over 10 TTIs, which could be satisfied with 5 UP and 5 HOLD commands over 10 consecutive TTIs; or 6 UP, 1 DOWN, and 4 HOLD commands over 10 TTIs; etc.).

Figure 12:
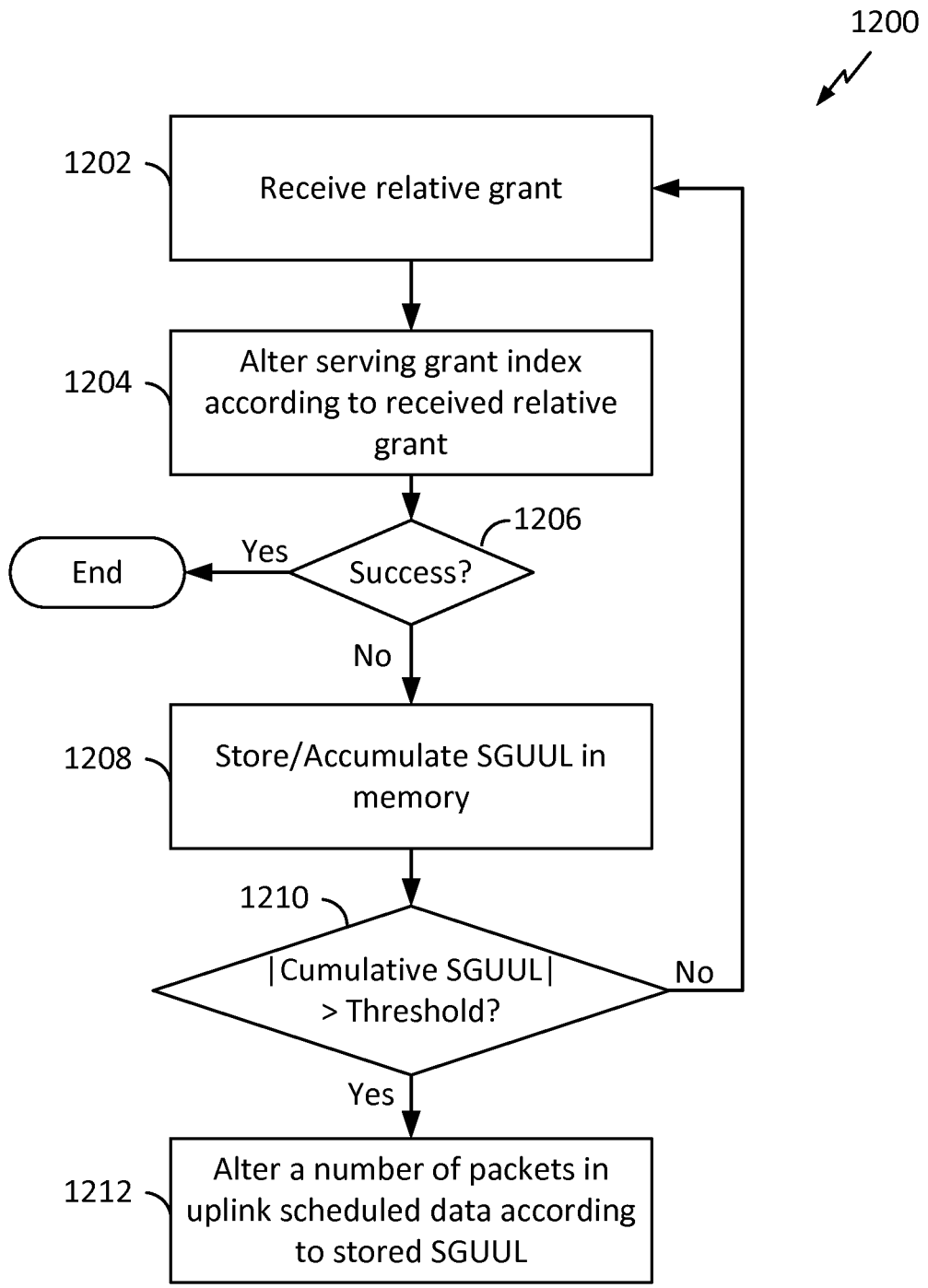
FIG. 12 is a flow chart illustrating a process of unilaterally altering a serving grant for the UE in accordance with a cumulative serving grant under-utilization loss according to one example.

Turning now to FIG. 12, a flow chart is provided to illustrate a process 1200 for altering a serving grant at the UE 210 according to a serving grant under-utilization loss (SGUUL). As described above, the serving grant at the UE 210 is generally translated into a number of bits, which are then quantized into a number of packets (e.g., protocol data units or PDUs). When the allowed number of bits does not quantize into an integer number of packets, a portion of the serving grant may be truncated to result in the integer number of packets. However, as described above, due to this truncation, depending on a network configuration, a change in the number of bits corresponding to an altered serving grant might result in the same number of PDUs, hindering the network intent. Thus, in an aspect of the disclosure, an SGUUL may be defined as the number of lost bits in the serving grant, which are not utilized due to the quantization of the packet (e.g., RLC PDU) size that is transmitted over a HSUPA channel in the current TTI.

In some examples, the process 1200 may be implemented by the UE 210. In some examples, the process 1200 may be implemented by one or more processors such as described in relation to the processing system 114 illustrated in FIG. 1. In some examples, the process 1200 may be implemented by any suitable means for implementing the described functions.

At step 1202, the UE 210 may receive a relative grant, e.g., on an E-RGCH (e.g., the serving E-RGCH or a non-serving E-RGCH), indicating an intent by the network to alter the UE's EUL data transmission rate. At step 1204, the UE 210 may accordingly alter the serving grant index in accordance with the received relative grant. At step 1206, the UE 210 may optionally determine whether the alteration of the serving grant index successfully altered the EUL data transmission rate in accordance with the network's intent. That is, during an E-TFCI selection procedure utilizing the altered serving grant index, a number of bits to be transmitted by the UE 210 within one TTI may be calculated, and accordingly quantized into an integer number of packets (e.g., RLC PDUs). In the event that the alteration is not successful, corresponding to a deadlock condition as described above, such that the number of packets is the same as it was prior to the receiving of the relative grant, or in some examples, at any time that there is serving grant under-utilization loss (SGUUL), at step 1208, information corresponding to the SGUUL corresponding to the truncated of a portion of a packet may be stored in a memory 592 at the UE 210.

In accordance with an aspect of the present disclosure, storing the SGUUL in the memory 592 may further include calculating a cumulative SGUUL, i.e., a cumulated SGUUL over a plurality of TTIs (e.g., the previous TTIs within a suitable window). That is, over multiple iterations of E-TFCI selection, as SGUULs recur, the UE 210 may be configured to accumulate these losses, for the purpose of correcting for what may eventually become rather large quantization losses.

At step 1210, the UE 210 may determine whether an absolute value of the cumulative SGUUL is greater than a suitable threshold (e.g., a predetermined threshold). In an aspect of the disclosure, the threshold for the cumulative SGUUL may be utilized in part to determine whether to unilaterally increase the serving grant in accordance with SGUULs resulting from UP commands, e.g., by including one or more additional packets in an uplink transmission in a TTI; or to unilaterally decrease the serving grant in accordance with SGUULs resulting from DOWN commands, e.g., by including one or more fewer packets in an uplink transmission in a TTI. That is, the UE 210 may unilaterally increase the number of packets in the uplink transmission when it detects the network intent to increase the data rate, as well as the deadlock condition as described above. For example, the UE 210 may include one more packet in its scheduled data when the network is determined to have an intention to raise the serving grant with one or more detected RGCH UP commands, and when the cumulative SGUUL crosses the predetermined threshold. On the other hand, the UE 210 may include one fewer packet in its scheduled data when the network is determined to have an intention to lower the serving grant with one or more detected RGCH DOWN commands, and when the cumulative SGUUL crosses the predetermined threshold. Thus, at step 1212, the UE 210 may alter the uplink data rate as described.

Figure 13:
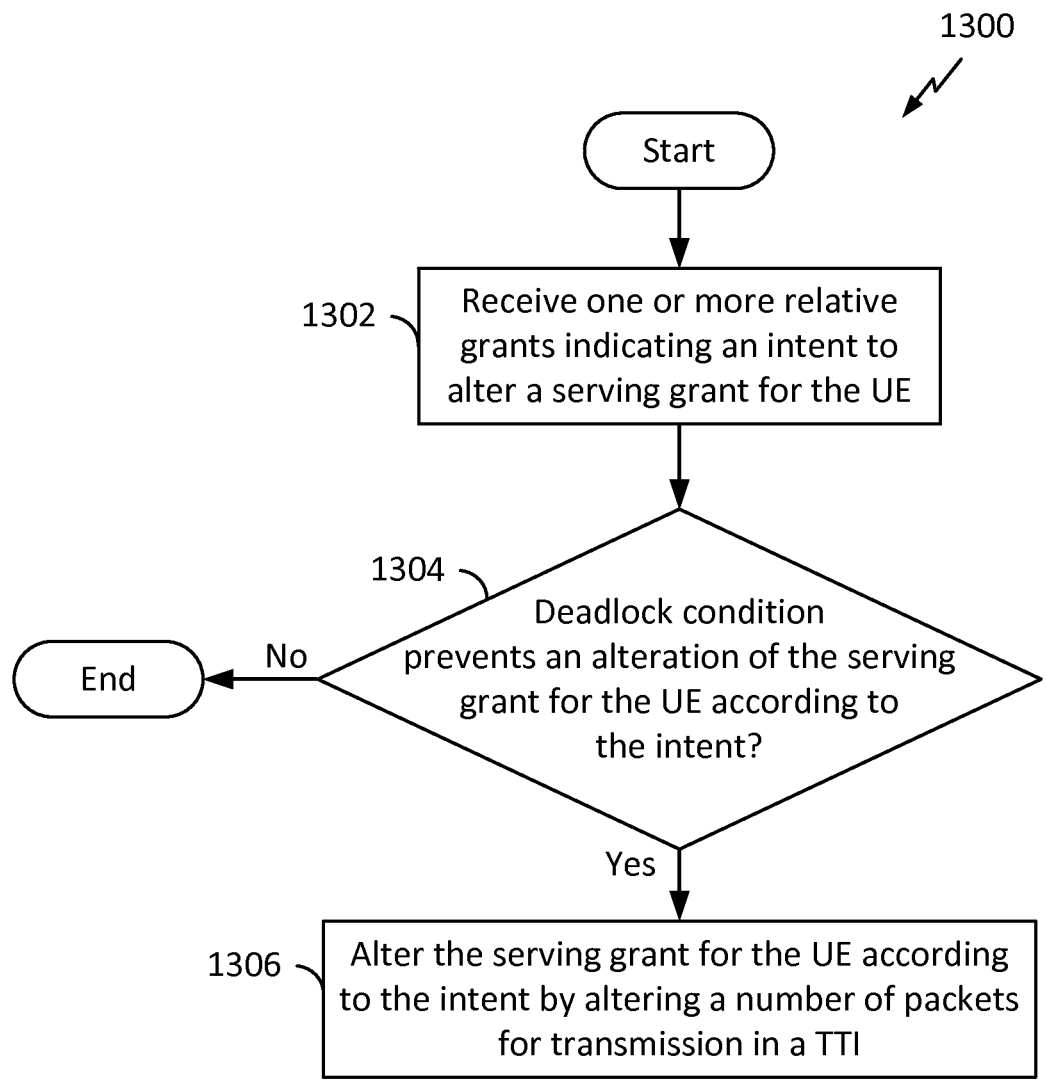
FIG. 13 is a flow chart illustrating a process of altering a serving grant to fulfill a network intent in accordance with one example.

FIG. 13 is a flow chart illustrating another example of a process 1300 for altering a serving grant in accordance with a network intent, in accordance with some aspects of the disclosure. In some examples, the process 1300 may be implemented by the UE 210. In some examples, the process 1300 may be implemented by one or more processors such as described in relation to the processing system 114 illustrated in FIG. 1. In some examples, the process 1300 may be implemented by any suitable means for implementing the described functions.

At step 1302, the UE 210 may receive one or more relative grants indicating an intent to alter a serving grant for the UE 210. For example, E-RGCH UP or DOWN commands may be received, for example, from the serving cell or, in the case of the DOWN command, from a non-serving cell. At step 1304, the UE 210 may determine whether a deadlock condition, as described above, prevents the alteration of the serving grant for the UE according to the determined intent. If no, then the process ends, as the serving grant is successfully altered in accordance with the network intent. However, if the deadlock condition exists, then at step 1306 the UE 210 may unilaterally alter the serving grant for the UE 210 according to the intent, by altering a number of packets for transmission in a TTI.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at a user equipment (UE), comprising:
receiving a first relative grant indicating an intent to alter a serving grant for the UE;
determining that a deadlock condition prevents an alteration of the serving grant for the UE according to the intent;
altering the serving grant for the UE according to the intent by altering a number of packets for transmission in a transmission time interval (TTI); and
receiving a plurality of relative grants including the first relative grant, wherein the altering of the serving grant for the UE comprises detecting that the plurality of relative grants comprises greater than a threshold number of relative grants each indicating the intent to alter the serving grant for the UE.

2. The method of claim 1, wherein the first relative grant comprises an UP command.

3. The method of claim 2, wherein the altering of the serving grant for the UE comprises increasing the serving grant for the UE to include one more packet.

4. The method of claim 1, wherein the first relative grant comprises a DOWN command.

5. The method of claim 4, wherein the altering of the serving grant for the UE comprises decreasing the serving grant for the UE to include one less packet.

6. The method of claim 1, wherein the altering of the serving grant for the UE comprises changing a number of scheduled data packets per TTI by one, according to the intent.

7. The method of claim 1, wherein the detecting that the plurality of relative grants comprises greater than the threshold number of relative grants comprises detecting the relative grants as consecutively received relative grants each indicating the intent to alter the serving grant for the UE.

8. The method of claim 1, wherein the detecting that the plurality of relative grants comprises greater than the threshold number of relative grants comprises receiving the plurality of relative grants over a receive window, wherein the threshold number of relative grants is detected over the receive window.

9. The method of claim 1, wherein the deadlock condition preventing the alteration of the serving grant for the UE according to the intent is due to size quantization of the packets for transmission in the TTI.

10. A user equipment (UE) operable in a wireless communication network, comprising:
means for receiving a first relative grant indicating an intent to alter a serving grant for the UE;

means for determining that a deadlock condition prevents an alteration of the serving grant for the UE according to the intent;

means for altering the serving grant for the UE according to the intent by altering a number of packets for transmission in a transmission time interval (TTI); and means for receiving a plurality of relative grants including the first relative grant, wherein the altering of the serving grant for the UE comprises detecting that the plurality of relative grants comprises greater than a threshold number of relative grants each indicating the intent to alter the serving grant for the UE.

11. The UE of claim 10, wherein the first relative grant comprises an UP command.

12. The UE of claim 11, wherein the means for altering the serving grant for the UE is configured to increase the serving grant for the UE to include one more packet.

13. The UE of claim 10, wherein the first relative grant comprises a DOWN command.

14. The UE of claim 13, wherein the means for altering the serving grant for the UE is configured to decrease the serving grant for the UE to include one less packet.

15. The UE of claim 10, wherein the means for altering the serving grant for the UE is configured to change a number of scheduled data packets per TTI by one, according to the intent.

16. The UE of claim 10, wherein the means for detecting that the plurality of relative grants comprises greater than the threshold number of relative grants is configured to detect the relative grants as consecutively received relative grants each indicating the intent to alter the serving grant for the UE.

17. The UE of claim 10, wherein the means for detecting that the plurality of relative grants comprises greater than a threshold number of relative grants is configured to receive the plurality of relative grants over a receive window, wherein the threshold number of relative grants is detected over the receive window.

18. The UE of claim 10, wherein the deadlock condition preventing the alteration of the serving grant for the UE according to the intent is due to size quantization of the packets for transmission in the TTI.

19. A user equipment (UE) operable in a wireless communication network, comprising:
at least one processor;
a communication interface coupled to the at least one processor;
a memory coupled to the at least one processor,
wherein the at least one processor is configured to:
receive a first relative grant indicating an intent to alter a serving grant for the UE;
determine that a deadlock condition prevents an alteration of the serving grant for the UE according to the intent;
alter the serving grant for the UE according to the intent by altering a number of packets for transmission in a transmission time interval (TTI); and
wherein the at least one processor is further configured to receive a plurality of relative grants including the first relative grant, wherein the at least one processor, being configured to alter the serving grant for the UE, is further configured to detect that the plurality of relative grants comprises greater than a threshold number of relative grants each indicating the intent to alter the serving grant for the UE.

20. The UE of claim 19, wherein the first relative grant comprises an UP command.

21. The UE of claim 20, wherein the at least one processor, being configured to alter the serving grant for the UE, is further configured to increase the serving grant for the UE to include one more packet.

22. The UE of claim 19, wherein the first relative grant comprises a DOWN command.

23. The UE of claim 22, wherein the at least one processor, being configured to alter the serving grant for the UE, is further configured to decrease the serving grant for the UE to include one less packet.

24. The UE of claim 19, wherein the at least one processor, being configured to alter the serving grant for the UE, is further configured to change a number of scheduled data packets per TTI by one, according to the intent.

25. The UE of claim 19, wherein the at least one processor, being configured to detect that the plurality of relative grants comprises greater than the threshold number of relative grants, is further configured to detect the relative grants as consecutively received relative grants each indicating the intent to alter the serving grant for the UE.

26. The UE of claim 19, wherein the at least one processor, being configured to detect that the plurality of relative grants comprises greater than the threshold number of relative grants, is further configured to receive the plurality of relative grants over a receive window, wherein the threshold number of relative grants is detected over the receive window.

27. The UE of claim 19, wherein the deadlock condition preventing the alteration of the serving grant for the UE according to the intent is due to size quantization of the packets for transmission in the TTI.

28. A computer program product, comprising:
a non-transitory computer-readable storage medium operable at a user equipment (UE), the non-transitory computer-readable storage medium comprising:
instructions for causing a computer to receive a first relative grant indicating an intent to alter a serving grant for the UE;
instructions for causing the computer to determine that a deadlock condition prevents an alteration of the serving grant for the UE according to the intent;
instructions for causing the computer to alter the serving grant for the UE according to the intent by altering a number of packets for transmission in a transmission time interval (TTI); and
wherein the non-transitory computer-readable storage medium further comprises instructions for causing a computer to receive a plurality of relative grants including the first relative grant, wherein the instructions for causing a computer to alter the serving grant for the UE comprise instructions for causing a computer to detect that the plurality of relative grants comprises greater than a threshold number of relative grants each indicating the intent to alter the serving grant for the UE.

29. The computer program product of claim 28, wherein the first relative grant comprises an UP command.

30. The computer program product of claim 29, wherein the instructions for causing the computer to alter the serving grant for the UE comprise instructions for causing the computer to increase the serving grant for the UE to include one more packet.

31. The computer program product of claim 28, wherein the first relative grant comprises a DOWN command.

32. The computer program product of claim 31, wherein the instructions for causing the computer to alter the serving grant for the UE comprise instructions for causing the computer to decrease the serving grant for the UE to include one less packet.

33. The computer program product of claim 28, wherein the instructions for causing the computer to alter the serving grant for the UE comprise instructions for causing the computer to change a number of scheduled data packets per TTI by one, according to the intent.

34. The computer program product of claim 28, wherein the instructions for causing the computer to detect that the plurality of relative grants comprises greater than the threshold number of relative grants comprise instructions for causing the computer to detect the relative grants as consecutively received relative grants each indicating the intent to alter the serving grant for the UE.

35. The computer program product of claim 28, wherein the instructions for causing the computer to detect that the plurality of relative grants comprises greater than the threshold number of relative grants comprise instructions for causing the computer to receive the plurality of relative grants over a receive window, wherein the threshold number of relative grants is detected over the receive window.

36. The computer program product of claim 28, wherein the deadlock condition preventing the alteration of the serving grant for the UE according to the intent is due to size quantization of the packets for transmission in the TTI.

\* \* \* \* \*